United States Patent
Faucher et al.

(10) Patent No.: US 7,882,302 B2
(45) Date of Patent: Feb. 1, 2011

(54) METHOD AND SYSTEM FOR IMPLEMENTING PRIORITIZED REFRESH OF DRAM BASED CACHE

(75) Inventors: Marc R. Faucher, South Burlington, VT (US); Peter A. Sandon, Essex Junction, VT (US); Arnold S. Tran, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 11/949,859

(22) Filed: Dec. 4, 2007

(65) Prior Publication Data

US 2009/0144491 A1 Jun. 4, 2009

(51) Int. Cl.
G06F 13/00 (2006.01)
(52) U.S. Cl. ........................ 711/106; 711/128
(58) Field of Classification Search ................. 711/106, 711/128, 144, E12.001
See application file for complete search history.

(56) References Cited

U.S. PATENT DOCUMENTS

| | | | |
|---|---|---|---|
| 4,625,296 A | 11/1986 | Shriver | |
| 5,390,308 A | 2/1995 | Ware et al. | |
| 5,422,846 A | 6/1995 | Chang et al. | |
| 6,148,294 A * | 11/2000 | Beyda et al. | 1/1 |
| 6,295,593 B1 | 9/2001 | Hsu et al. | |
| 6,311,280 B1 | 10/2001 | Vishin | |
| 6,347,357 B1 | 2/2002 | Sartore et al. | |
| 6,389,505 B1 | 5/2002 | Emma et al. | |
| 6,556,501 B1 | 4/2003 | Naffziger | |
| 6,625,056 B1 | 9/2003 | Kihara | |
| 6,678,814 B2 | 1/2004 | Arimilli et al. | |
| 6,697,909 B1 | 2/2004 | Wang et al. | |
| 6,775,176 B2 | 8/2004 | Kihara | |
| 6,819,618 B2 | 11/2004 | Kshiwazaki | |
| 6,826,106 B2 | 11/2004 | Chen | |
| 6,965,536 B2 | 11/2005 | Shirley | |
| 7,038,940 B2 | 5/2006 | Swanson et al. | |
| 7,039,756 B2 | 5/2006 | Emerson et al. | |
| 2002/0138690 A1 | 9/2002 | Simmonds et al. | |
| 2003/0053361 A1 | 3/2003 | Zhang et al. | |
| 2003/0218930 A1 | 11/2003 | Lehmann et al. | |
| 2005/0002253 A1 | 1/2005 | Shi et al. | |
| 2005/0102475 A1 | 5/2005 | Reohr et al. | |
| 2005/0108460 A1 | 5/2005 | David | |
| 2006/0036811 A1 | 2/2006 | Dieffenderfer et al. | |
| 2006/0041720 A1 | 2/2006 | Hu et al. | |
| 2006/0107090 A1 | 5/2006 | Emma et al. | |
| 2006/0133173 A1 | 6/2006 | Jain et al. | |
| 2006/0190676 A1 | 8/2006 | Butler et al. | |
| 2007/0136523 A1 * | 6/2007 | Bonella et al. | 711/113 |

* cited by examiner

*Primary Examiner*—Pierre-Michel Bataille
(74) *Attorney, Agent, or Firm*—Cantor Colburn LLP; Michael LeStrange

(57) ABSTRACT

A method for implementing prioritized refresh of a multiple way, set associative DRAM based cache includes identifying, for each of a plurality of sets of the cache, the existence of a most recently used way that has not been accessed during a current assessment period; and for each set, refreshing only the identified most recently used way of the set not accessed during the current assessment period, while ignoring the remaining ways of the set; wherein a complete examination of each set for most recently used ways therein during the current assessment period constitutes a sweep of the cache.

20 Claims, 4 Drawing Sheets

Set 0
- Way 0
- Way 1
- Way 2
- ⋮
- Way m

Set 1
- Way 0
- Way 1
- Way 2
- ⋮
- Way m

⋮

Set n
- Way 0
- Way 1
- Way 2
- ⋮
- Way m

METHOD AND SYSTEM FOR IMPLEMENTING PRIORITIZED REFRESH OF DRAM BASED CACHE

BACKGROUND

The present invention relates generally to integrated circuit memory devices and, more particularly, to a method and system for implementing prioritized refresh of DRAM based cache.

Memory devices are used in a wide variety of applications, including computer systems. Computer systems and other electronic devices containing a microprocessor or similar device typically include system memory, which is generally implemented using dynamic random access memory (DRAM). A DRAM memory cell typically includes, as basic components, an access transistor (switch) and a capacitor for storing a binary data bit in the form of a charge. Typically, a first voltage is stored on the capacitor to represent a logic HIGH or binary "1" value (e.g., $V_{DD}$), while a second voltage on the storage capacitor represents a logic LOW or binary "0" value (e.g., ground).

The primary advantage of DRAM is that it uses relatively few components to store each bit of data, and is thus a relatively inexpensive means for providing system memory having a relatively high capacity. A disadvantage of DRAM, however, is DRAM memory cells must be periodically refreshed as the charge on the capacitor eventually leaks away and therefore provisions must be made to "refresh" the capacitor charge. Otherwise, the data bit stored by the memory cell is lost. While an array of memory cells is being refreshed, it cannot be accessed for a read or a write memory access. The need to refresh DRAM memory cells does not present a significant problem in most applications, however it can prevent the use of DRAM in applications where immediate access to memory cells is required or highly desirable.

Thus, in certain instances, the refresh process involves accessing memory locations corresponding to the same location from which data is needed for system operation. This contention with refresh increases the average latency of the operational accesses. Many refresh algorithms have been devised that attempt to reduce the effect of the refresh process on memory latency. Since, in most cases, it is critical that all memory locations be refreshed within a given period of time, these algorithms systematically work their way through memory addresses from one end to the other. Unfortunately, such a systematic, linear access pattern makes it difficult to avoid instances where refresh and operational accesses conflict.

SUMMARY

The foregoing discussed drawbacks and deficiencies of the prior art are overcome or alleviated by a method for implementing prioritized refresh of a multiple way, set associative DRAM based cache. In an exemplary embodiment, the method includes identifying, for each of a plurality of sets of the cache, the existence of a most recently used way that has not been accessed during a current assessment period; and for each set, refreshing only the identified most recently used way of the set not accessed during the current assessment period, while ignoring the remaining ways of the set; wherein a complete examination of each set for most recently used ways therein during the current assessment period constitutes a sweep of the cache.

In another embodiment, a system for implementing prioritized refresh of a multiple way, set associative DRAM based cache includes a refresh mechanism associated with the cache; the refresh mechanism configured to identify, for each of a plurality of sets of the cache, the existence of a most recently used way that has not been accessed during a current assessment period; and the refresh mechanism further configured to, for each set, refresh only the identified most recently used way of the set not accessed during the current assessment period, while ignoring the remaining ways of the set; wherein a complete examination of each set for most recently used ways therein during the current assessment period constitutes a sweep of the cache.

BRIEF DESCRIPTION OF THE DRAWINGS

Referring to the exemplary drawings wherein like elements are numbered alike in the several Figures:

FIG. 3 is a schematic representation of an m-way associative DRAM cache having n sets.

DETAILED DESCRIPTION

Disclosed herein is a method and system for implementing prioritized refresh of DRAM based cache. Briefly stated, an adjustable or "lazy" refresh mechanism for DRAM cache is utilized to achieve a desired balance between the power dissipated by the refresh mechanism, the contention of the refresh mechanism with the operational accesses and the number of lines that are not refreshed (and which are thus refetched if needed). At one end of the spectrum, the entire refresh mechanism itself can simply be suspended such as, for example, in applications where most of the cache lines are repeatedly accessed through read and/or write operations within a retention time period of the DRAM cells. While this setting minimizes refresh power and access contention, it also maximizes the number of lines that expire (due to not being accessed by a read/write operation) and are accordingly invalidated.

On the other hand, an intermediate level of refresh would allow for a refresh engine to sweep through the cache sets some maximum number of times (less than the number of ways per set) while avoiding contention with operational accesses. At the other end of the spectrum, the refresh mechanism would sweep through the cache a sufficient number of times to guarantee complete refresh, by prioritizing its accesses above operational ones, if necessary, to guarantee completeness. Although a complete sweep is more similar to a conventional refresh mechanism, it does offer the additional advantage of a reduced power refresh, since only those cache lines that need to be refreshed (i.e., not operationally accessed) are refreshed by a refresh operation.

Figure 1:
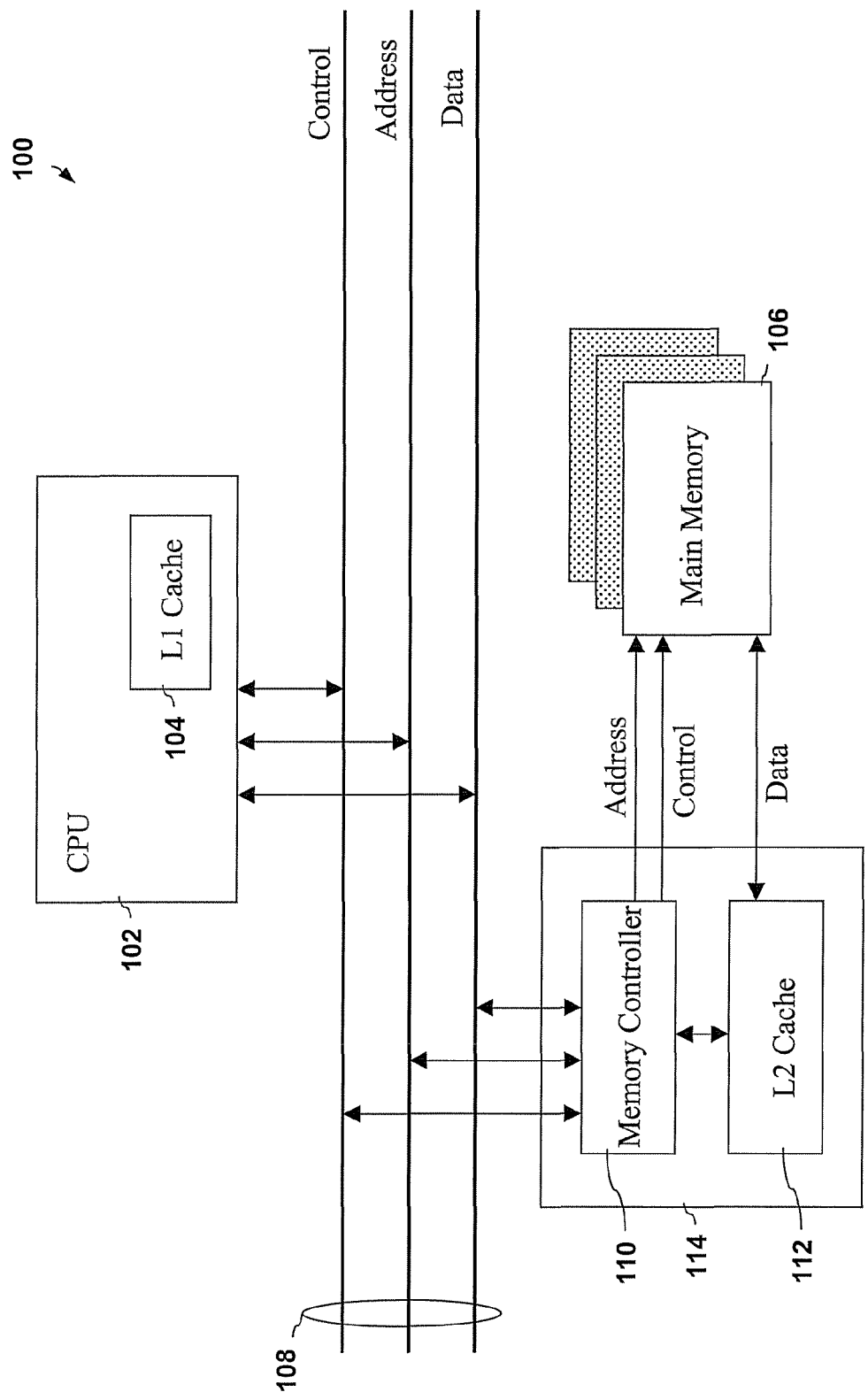
FIG. 1 is a schematic block diagram illustrating an exemplary memory organization of a computer system suitable for use in accordance with an embodiment of the present invention.

Referring initially to FIG. 1, there is shown a block diagram illustrating an exemplary memory organization of a computer system 100 suitable for use in accordance with an embodiment of the present invention. The computer system 100 includes a central processing unit (CPU) 102 with an on-chip cache memory (L1 Cache) 104, a main memory 106, CPU bus 108, a memory controller 110 for controlling data traffic on the CPU bus 108, and a second level cache memory (L2 Cache) 112.

The first level cache memory 104 is integrated on the same chip with the CPU 102 and, as a result, is faster than main memory 106 with a higher bandwidth and shorter wire length, therefore avoiding any delay associated with transmitting and/or receiving signals to and/or from an external chip. The second level cache memory 112 is located on a different chip 114 than the CPU 102, and has a larger capacity than the first level cache memory 104 but smaller than the main memory 106. In an alternate configuration of the memory organization, the second level cache memory 112 is located on the same chip as the CPU 102.

The cache memories 104, 112 serve as buffers between the CPU 102 and the main memory 106. In each of the cache memories 104, 112, data words are stored in a cache memory and are grouped into small pages called "cache blocks" or "cache lines". The contents of the cache memory are a copy of a set of main memory blocks. Each cache line is marked with a "TAG address" that associates the cache line with a corresponding part of the main memory. TAG addresses (which may be non-continuous) assigned to the corresponding cache lines are stored in a special memory, called a TAG memory or directory.

In the first level cache memory 104, when an address is requested by the CPU 102 to access certain data, the requested address is compared to TAG addresses stored in a TAG memory of the first level cache memory 104. If the requested address is found among the TAG addresses in the TAG memory, it is determined that data corresponding to the requested address is present in the cache memory 104, which is referred to as a "hit". Upon finding the data of the requested address in the cache memory 104, the data is transferred to the CPU 102. The TAG memory may also contain an offset address to locate the data in the cache memory 104. Locating data in a cache memory is well known in the art, thus a detailed description thereof is omitted herein.

On the other hand, if the requested address is not found in the TAG memory of the cache memory 104, it is determined that the data corresponding to the requested address is not present in the cache memory 104, which is referred to as a "miss". When a miss occurs in the first level cache memory 104, the requested address is sent to a lower level memory, for example, the second level cache memory 112. If a miss occurs in the second level cache memory 112 (i.e., the data is not present in the second level cache memory), the requested address is sent to a third level cache memory (if available) or a main memory.

In FIG. 1, since the computer system may employ an SRAM for the first level cache memory 104 and a DRAM for the second level cache memory 112, no data refresh process is required for the first level cache memory 104. Thus, a method and system for implementing prioritized refresh of DRAM based cache is described, for example, with respect to the second level cache memory 112. However, it should be noted that the present invention embodiments applies to any DRAM cache memory used in a hierarchical memory system to support main memory. Therefore, in the event that DRAM is used for the first level cache memory 104, the method and system for implementing prioritized refresh of DRAM based cache could also be described with respect to the first level cache memory 104.

Unlike previous approaches, the present embodiments utilize a status bit for each quantum of memory that can be individually refreshed. These bits are used to guide the refresh engine in conditionally refreshing memory locations. Since these bits also maintain status on which memory locations have been accessed recently for normal memory operations, the refresh mechanism can opportunistically refresh locations most in need of a refresh cycle. Furthermore, the refresh mechanism can prioritize which locations are refreshed, and can simply fail to refresh low priority memory locations.

Figure 2:
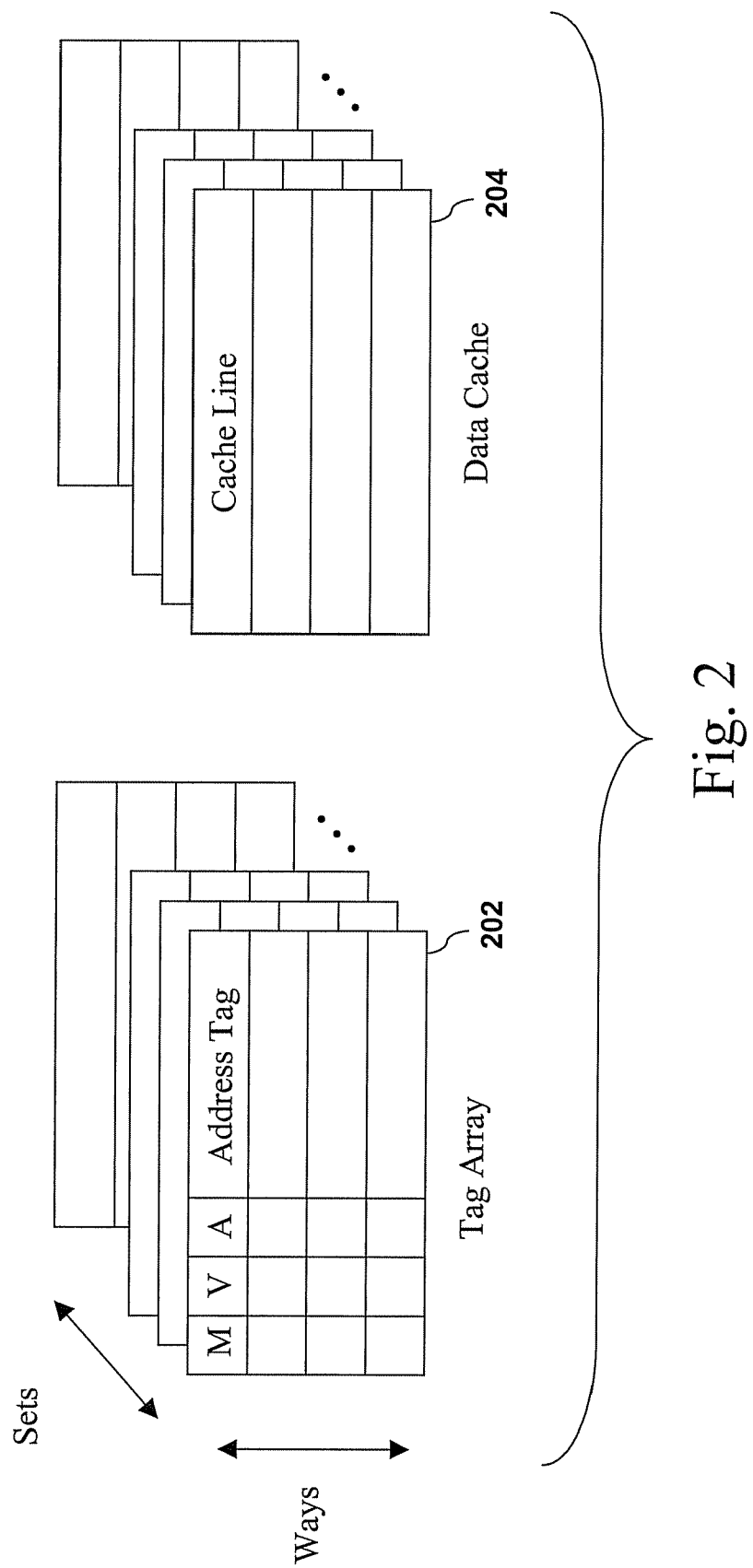
FIG. 2 is a schematic diagram of a portion of a SRAM based tag array associated with a DRAM data cache, the tag array having an access bit for enabling a refreshless DRAM mode of operation in accordance with an embodiment of the invention.

Referring to FIG. 2, there is shown a schematic diagram of a portion of a SRAM based tag array 202 associated with a DRAM data cache 204 (e.g., for L1 cache or L2 cache). Whereas an existing cache memory may integrate a valid bit and a modified bit as status bits in an array, the present embodiments further incorporate a new access bit (A), in addition to a modified bit (M) and a valid bit (V), as a third status bit within the tag array 202, which indicates the status of cache lines or words in terms of dynamic DRAM data integrity.

Data in the date cache 204 automatically refreshes during DRAM read and write operations. Subsequently, any reads or writes of a cache line or word will update its corresponding tag access bit (A) to a "1", thus confirming valid data (V). Implementation of the access bit structure may be configured with varying degrees of data resolution, from cache lines to sectors. The operability of a totally refreshless DRAM cache may be implemented by establishing a "safe" refresh interval metric that ensures data integrity. Once that metric has been established, a valid assessment (evaluation) interval can be executed. Each time this metric interval has been achieved, data evaluation in terms of data expiration is determined. Additional information concerning a refreshless DRAM cache may be found in Ser. No. 11/650,015, assigned to the assignee of the present application, the contents of which are incorporated herein in their entirety.

With respect to the adjustable refresh mechanism disclosed herein for a DRAM cache, the operation of a 4-way, set-associative SRAM cache may first be considered. When a particular address is used to access the cache, the corresponding data is found in one of the four ways of a particular set (congruence class), or not at all. In the latter case (i.e., for a cache miss), one of the four ways of that set must be chosen for replacement by the data to be brought in from higher up in the memory hierarchy. Typically, a least-recently used (LRU) policy is used to choose a replacement way. A set of LRU bits is maintained in the tag array for each set to keep track of the LRU ordering of the ways. For a 4-way set associative cache, there are 24 possible LRU orderings of the four ways, and thus at least five bits are needed to maintain this ordering. For ease of implementation, one or more additional bits might be used to represent the LRU ordering.

Figure 4:
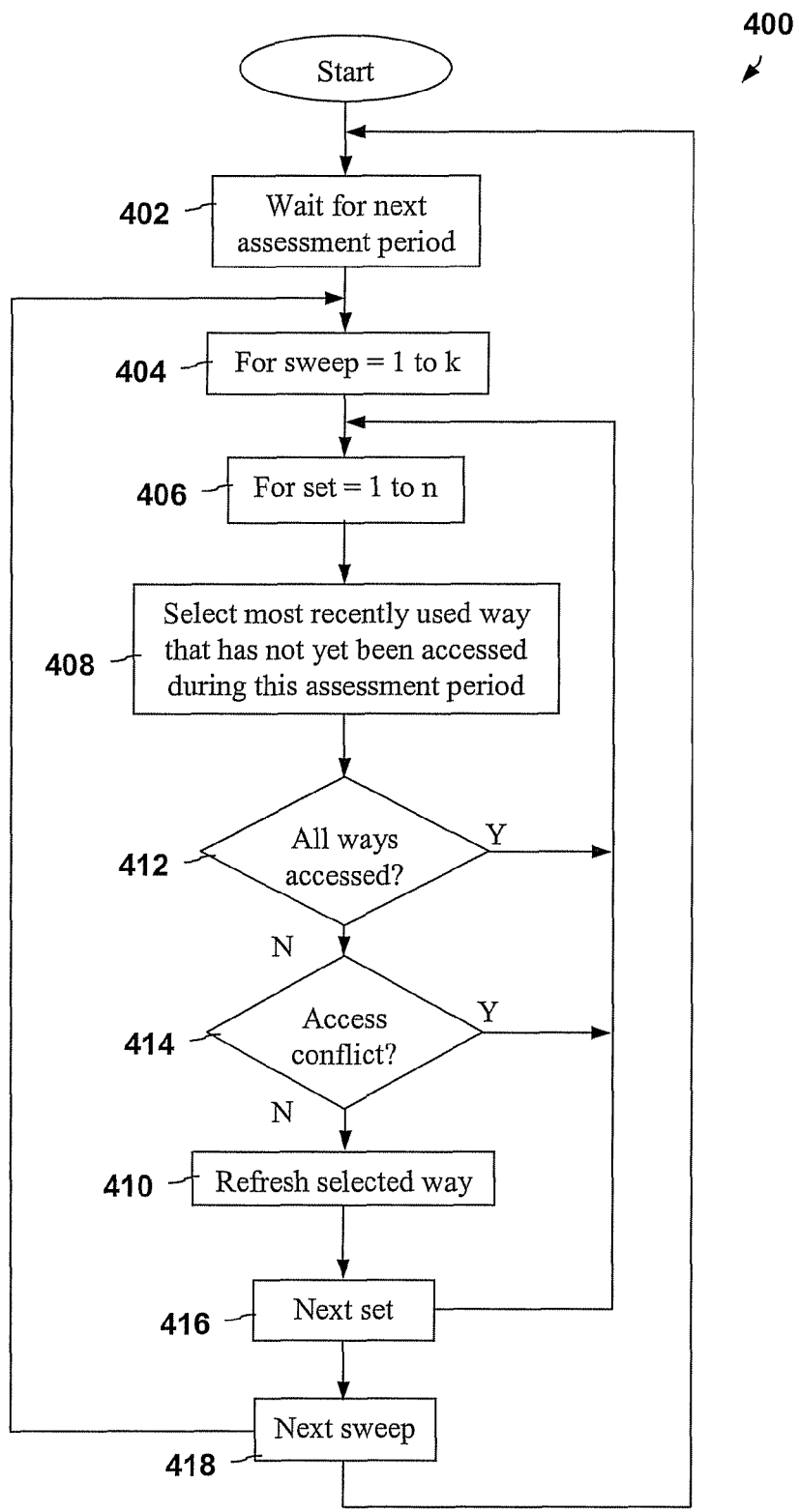
FIG. 4 is a flow diagram illustrating a method for implementing prioritized refresh of DRAM based cache, in accordance with an embodiment of the invention.

Referring now to FIGS. 3 and 4, a method and system for implementing prioritized refresh of DRAM based cache is now described. In particular, FIG. 3 is a schematic representation of an m-way associative DRAM cache 300 having n sets. Here, an "m-way" associative cache refers to any set-associative cache having at least 2 ways. FIG. 4 is a flow diagram illustrating the operation of the refresh mechanism for the DRAM cache.

The refresh mechanism keeps track of which ways within each set have been accessed, either for refresh or for operational data, using a mechanism as described above. That is, one or more "access" bits in the tag array are used to maintain status regarding recent accesses of the cache line or partial lines within each way. For example, all access bits are reset at the beginning of an evaluation period. At least two evaluation periods occur for every refresh period. During the evaluation period, anytime a way is accessed, the corresponding access bit is set. At the end of each evaluation period, if the access bit has not been set, the valid bit is reset, marking the line as no longer being contained in the cache.

In the present embodiments, the refresh mechanism queries the LRU and access bits to determine a priority for refreshing one way of a cache set. For example, in one embodiment, the refresh mechanism can sweep through the cache sets in linear order, refreshing only the highest priority way. During the next sweep, another way in that set can be refreshed. If the refresh access would conflict with an operational access, the refresh access can be delayed or even skipped. For a given refresh period, if contention with operational accesses is low, all cache lines are likely to be refreshed. If contention with operational accesses is high, some cache lines might not be refreshed, and so will be invalidated at the end of the evaluation period. However, these will be low priority cache lines, as described below, and so their invalidation will not have a significant impact on performance. This "incomplete" refresh mechanism is acceptable because any lost data can be restored from higher up in the memory hierarchy, and is advantageous because it minimizes both the contention of refresh with operational accesses, and the power dissipation due to refresh.

The priority mechanism may be summarized as follows. The cache lines are already ordered within each set by the LRU bits, from the most recently used (MRU) way to the LRU way. In addition, the access bits indicate which ways have been recently accessed, and so do not need a refresh cycle. The highest priority way with respect to refresh is therefore the most recently used way whose access bit is inactive. When that cache line is refreshed, the corresponding access bit is set. This indicates to the access/invalidate mechanism that the line has been refreshed and need not be invalidated, and indicates to the refresh mechanism on the next sweep that this line need not be considered for refresh.

Referring specifically now to FIG. 4, flowchart 400 illustrates the operation of the refresh mechanism (which may be programmed or configured, for example, within a memory controller). The number of sweeps, k, through the n cache sets is a selectable parameter for the refresh mechanism. The greater the number of sweeps, the more complete the refresh process becomes (at the cost of increased power consumption and potential access contention). With a lesser number of sweeps, less refresh power is used along with reduced access contention. On the other hand, the number of lines that expire due to not being accessed (and are accordingly invalidated) is increased.

As shown in block 402 of FIG. 4, the refresh mechanism waits for the next defined assessment period prior to beginning a new set of refresh sweeps through the cache organization. Then, in block 404, the process enters a first loop in order to perform k number of total sweeps, depending on the selected (e.g., programmed) value of k. In block 406, the process enters a second loop in order to examine each of the n sets of the cache during the current sweep. In other words, for every sweep through the cache, every set is inspected. As shown in block 408, using the LRU and access bits in the tag array the current set is examined, and the most recently used way that has not yet been accessed during the current assessment period is selected for refresh at block 410. However, if at decision block 412 it is first determined that all ways in the current set have already been accessed, no refresh cycle occurs for that set, and the process loops back to the next of the n sets at block 406. In addition, decision block 414 also determines whether (even if all the ways in the set have not already been accessed) the refresh cycle would conflict with an operational access. If so, then no refresh cycle occurs for that set, and the process loops back to the next of the n sets at block 406.

If the selected way is in fact refreshed at block 410, then the next set is examined by advancing to block 416 and incrementing the set counter and looping back to block 406. Upon completion of the loop through the last of the n sets, the next sweep is performed as described above (i.e., the process loops from block 418 back to block 404). Finally, once the selected k number of sweeps of each of the n sets has been performed, the process returns back to block 402 to wait for the next assessment period. Upon the next assessment period, the process continues beginning with the first sweep and the first set as described above.

The invention embodiments are most easily applied to a cache that is managed in "write-through" mode, such that modified data is always copied to a higher level in the memory hierarchy whenever it is written to this cache. In that case, no data is lost when a cache line is invalidated by the mechanism described herein. In the case of a cache that is managed in "write-back" mode, such that the only copy of a modified line of data is maintained in the cache, the invention embodiments may also be applied. In an exemplary embodiment, to insure that each way in each set is accessed or refreshed at some time during an assessment period, the number, k, of sweeps through the cache sets is set to (at least) the number of ways in each set. Furthermore, in cases of conflicts between refresh and operational accesses, the refresh cycle may be configured to have priority. In other words, in terms of FIG. 4, decision block 414 could be eliminated.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for implementing prioritized refresh of a multiple way, set associative DRAM based cache, the method comprising:
   identifying, for each of a plurality of sets of the cache, the existence of a most recently used way that has not been accessed during a current assessment period; and
   for each set, refreshing only the identified most recently used way of the set not accessed during the current assessment period, while ignoring the remaining ways of the set;
   wherein a complete examination of each set for most recently used ways therein during the current assessment period constitutes a sweep of the cache.

2. The method of claim 1, wherein a number, k, of sweeps of the cache performed during the current assessment period is configurable.

3. The method of claim 2, wherein k=1.

4. The method of claim 2, wherein k is set to equal to the number of ways in each set of the cache.

5. The method of claim 1, wherein, for any set for which all ways thereof have been accessed by at least one of a read or write operation during the current assessment period, none of the ways thereof are refreshed during the current assessment period.

6. The method of claim 1, wherein an access conflict of a given way supercedes refreshing thereof.

7. The method of claim 1, wherein refreshing of a given way supercedes an access conflict thereto.

8. The method of claim 1, further comprising determining un-accessed ways during the current assessment period though the use of an access bit incorporated into a cache tag array.

9. The method of claim 8, wherein data in un-accessed ways during the current assessment period is marked as invalid at the end of the current assessment period.

10. The method of claim 1, further comprising implementing at least two assessment periods within a time corresponding to a retention time of DRAM cells of the cache.

11. A system for implementing prioritized refresh of a multiple way, set associative DRAM based cache, comprising:
   a refresh mechanism associated with the cache;
   the refresh mechanism configured to identify, for each of a plurality of sets of the cache, the existence of a most recently used way that has not been accessed during a current assessment period; and
   the refresh mechanism further configured to, for each set, refresh only the identified most recently used way of the set not accessed during the current assessment period, while ignoring the remaining ways of the set;
   wherein a complete examination of each set for most recently used ways therein during the current assessment period constitutes a sweep of the cache.

12. The system of claim 11, wherein a number, k, of sweeps of the cache performed during the current assessment period is configurable.

13. The system of claim 12, wherein k=1.

14. The system of claim 12, wherein k is set to equal to the number of ways in each set of the cache.

15. The system of claim 11, wherein, for any set for which all ways thereof have been accessed by at least one of a read or write operation during the current assessment period, none of the ways thereof are refreshed during the current assessment period.

16. The system of claim 11, wherein an access conflict of a given way supercedes refreshing thereof.

17. The system of claim 11, wherein refreshing of a given way supercedes an access conflict thereto.

18. The system of claim 11, wherein the refresh mechanism is further configured to determine un-accessed ways during the current assessment period though the use of an access bit incorporated into a cache tag array.

19. The system of claim 18, wherein data in un-accessed ways during the current assessment period is marked as invalid at the end of the current assessment period.

20. The system of claim 11, wherein the refresh mechanism is further configured to implement at least two assessment periods within a time corresponding to a retention time of DRAM cells of the cache.

* * * * *